United States Patent Office 3,164,632
Patented Jan. 5, 1965

---

3,164,632
BENZYL UREAS
Arthur Berger, Skokie, and Edeltraut E. Borgaes, Chicago, Ill., assignors to Baxter Laboratories Inc., Morton Grove, Ill., a corporation of Delaware
No Drawing. Filed Feb. 4, 1963, Ser. No. 256,159
6 Claims. (Cl. 260—553)

The present invention relates to novel organic benzyl ureas. More particularly, it relates to ring substituted benzyl ureas of the formula:

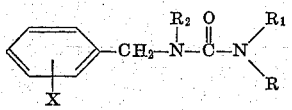

in which X is a member of the group consisting of halogen and lower alkyl, R is selected from the group consisting of hydrogen and lower alkyl, $R_1$ is a lower alkyl group, and $R_2$ is hydrogen or a methyl group.

The novel compounds of the present invention possess unusual properties which render them useful in novel applications. These compounds generally show considerable central nervous system depressant activity in animals making them promising candidates in the search for anticonvulsants, sedative and tranquilizing agents.

The synthesis of the benzyl mono alkyl ureas is usually effected by reacting equimolar quantities of the substituted amine with an isocyanate in the presence or absence of a solvent such as an alcohol, benzene or the chlorinated solvents. This reaction may be diagrammed as follows:

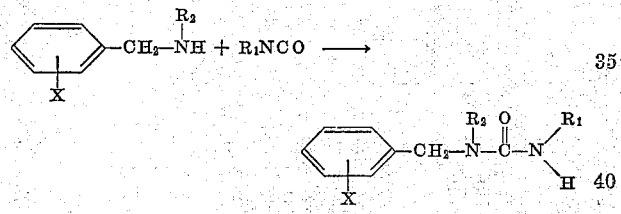

where the symbols X, $R_1$ and $R_2$ are as previously described.

When no solvent is used care must be exercised because the reaction is usually very vigorous. Occasionally cooling in ice is desirable to keep the reaction under control. Either the amine may be added to the isocyanate or vice versa without affecting the yield which is usually very high. If a solvent is employed it may be desirable to reflux the mixture to bring the reaction to completion.

Isolation of the novel compounds is usually quite simple as the novel benzyl ureas generally crystallize out upon cooling. If, however, the benzyl urea does not crystallize, it usually may be readily obtained in solid form by partially or completely removing the solvent. A single recrystallization is usually then sufficient to provide material of high purity.

The preparation of the novel benzyl dialkyl ureas of the present invention is accomplished by reacting the appropriate benzyl amine with a substituted carbamyl chloride in the presence or absence of solvents. This reaction may be diagrammed as follows:

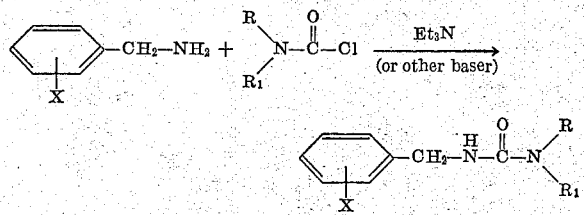

where the symbols X and $R_1$ are as previously described and R is lower alkyl.

Occasionally, the above reaction proceeds to completion without heating. In some situations, however, it is desirable to reflux the mixture to insure completion of the reaction.

Illustrative of the variety of alkyl and halogen substituted benzyl amines which may be used in preparing the compounds of the present invention are 4-isopropyl benzyl amine, 2-chlorobenzylamine, 2-bromobenzylamine, 4-chloro-N-methylbenzylamine, 4-chlorobenzylamine and the like. Representative of the alkyl isocyanates that may be used in such preparation are ethyl isocyanate, methyl isocyanate and the like. These reactants are generally available commercially or may be made by standard processes: Organic syntheses, coll. vol. III, 599, John Wiley and Sons, Inc. (1955). Representative of the carbamyl chlorides which may be used are the diethyl, dimethyl or ethyl methyl derivatives.

The ureas may be obtained from the corresponding thioureas by treatment with alkaline peroxide, metallic oxides or aqueous chloracetic acid. The reaction with alkaline peroxide may be diagrammed as follows:

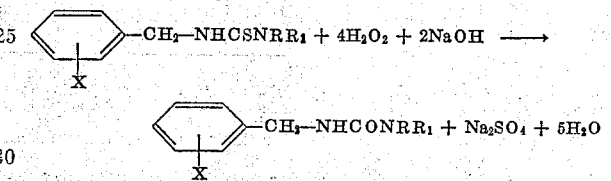

The following examples will further serve to illustrate the present invention:

EXAMPLE I

*1-Ethyl-3-(2-Methylbenzyl) Urea*

To 3.6 g. (0.05 mole) of ethyl isocyanate in 25 ml. of benzene was slowly added with stirring 6.1 g. (0.05 mole) of 2-methylbenzylamine. There was an immediate reaction and the product solidified while still quite hot. Recrystallization from absolute ethanol yielded 6.4 grams of white needles (M.P. 148–9°) of 1-ethyl-3-(2-methylbenzyl) urea.

EXAMPLE II

*1-(2-Bromobenzyl)-3-Methylurea*

To 5.2 g. (0.02 mole) of 1-(2-bromobenzyl)-3-methyl-2-thiourea in 100 ml. of absolute alcohol was added 140 ml. of 1 N sodium hydroxide. The mixture was heated to 70° C., stirred continuously by means of a magnetic stirrer and 90 ml. of 10% hydrogen peroxide added from a burette over a 30 minute period. On cooling a white solid separated out. It was recrystallized from benzene to yield 3.8 g. of 1-(2-bromobenzyl)-3-methylurea in the form of white needles (M.P. 155°).

EXAMPLE III

*1-Allyl-3-(2-Chlorobenzyl) Urea*

To a hot solution (70–80°) of 6.0 g. (0.025 mole) of 1-allyl-3-(2-chlorobenzyl)-2-thiourea in 25 ml. of ethanol and 100 ml. of 1 N sodium hydroxide, 60 ml. of 10% hydrogen peroxide was added dropwise with agitation. On cooling solid precipitated and was collected. After recrystallization from alcohol 3.4 g. (61% of the theoretical) of white needles (M.P. 120–2°) of 1-allyl-3-(2-chlorobenzyl) urea were isolated.

EXAMPLE IV

*1-n-Butyl-3-(2-Fluorobenzyl) Urea*

To 6.25 g. (0.05 mole) of 2-fluorobenzyl amine stirred and cooled in an icebath was added dropwise 5.0 g. (0.05 mole) of n-butyl isocyanate. There was an immediate reaction and the product readily solidified. Recrystallization from isopropyl ether produced 9.5 g. (85% of the theoretical yield) of 1-n-butyl-3-(2-fluorobenzyl) urea, light yellow needles (M.P. 63–5°). An additional 1.7 g. of crude product was obtained on evaporation of the isopropyl ether.

EXAMPLE V

1-(2-Chlorobenzyl)-3, 3-Dimethyl Urea

To 21.2 g. (0.15 mole) of 2-chlorobenzylamine and 18 g. (0.18 mole) of triethylamine in 75 ml. of benzene was slowly added 16.2 g. (0.15 mole) of dimethylcarbamyl chloride in 25 ml. of benzene. The reaction apparently took place very rapidly but to insure completion the mixture was refluxed for about 15 minutes, then allowed to cool to room temperature. The precipitated triethylamine hydrochloride was removed by 2 washings using 100 ml. of water each time. The benzene layer was dried over anhydrous sodium sulfate, then poured with stirring into 800 ml. of petroleum ether. The white solid which formed was collected and had M.P. 103–7°. On recrystallization from carbon tetrachloride 18 g. (56% of the theoretical of 1-(2-chlorobenzyl)-3, 3-dimethyl urea) (M.P. 104–6°) was obtained.

EXAMPLE VI

1-(2-Methylbenzyl)-3-Methylurea

To 12.1 g. (0.1 mole) of 2-methylbenzyl amine in 300 ml. of petroleum ether cooled in an ice-salt bath was added slowly with stirring 6.0 g. (small excess) of methyl isocyanate in 50 ml. of petroleum ether. The temperature was kept below 5° and 15 minutes after the addition was complete the white solid which formed was collected on a filter. It was recrystallized from ethyl acetate yielding 16.8 g. of long shiny white needles (M.P. 144–5°) of 1-(2-methylbenzyl)-3-methylurea.

The anticonvulsant activity of the compounds prepared above and that of the many related compounds was determined by administering the compounds intraperitoneally or orally to mice as a prophylactic against Pentylenetetrazol (Met) induced and electro shock seizures (MES). Some of the more active compounds in the anticonvulsant test are shown in the accompanying table.

Suitable dosage forms for the physiological testing of the novel compounds were prepared by either admixing a predetermined amount of the novel compound with a conventional solid pharmaceutical diluent and tableting the mixture or dissolving the compound in an acceptable parenteral fluid. It will, of course, be understood that a wide variety of other dosage forms may be prepared by combining the novel compound with other acceptable pharmaceutical diluents and/or adjuvants.

In general, the compounds containing the short chain alkyl groups are most effective as central nervous system depressants. Those compounds in which X is in the ortho position and equals Cl, Br, F or methyl; R is hydrogen or methyl, $R_1$ is methyl or ethyl, and $R_2$ is hydrogen, are especially preferred.

TABLE

| Compound | $ED_{50}$ or $AED_{50}$ MES i.p. (po) | $ED_{50}$ or $AED_{50}$ MET i.p. (po) | $LD_{50}$ or $ALD_{50}$ 7 Day i.p. (po) | $TD_{50}$ or $ATD_{50}$ i.p. (po) |
|---|---|---|---|---|
| 1-(2-chlorobenzyl)-3-methylurea | 60 (101) | 64 (92) | 405 (510) | 165 (560) |
| 1-(2-methylbenzyl)-3-methylurea | 47 (100) | 46 (118) | 530 (1550) | 150 (340) |
| 1-(2-bromobenzyl)-3-methylurea | 63 (130) | 44 (116) | 500 | 150 (510) |
| 1-(2-fluorobenzyl)-3-methylurea | 75 | 125 | 600 | 125 |
| 1,1-dimethyl-3-(2-fluorobenzyl)-urea | 37 | 66 | 600 | |
| 1-(2-chlorobenzyl)-3,3-dimethylurea | 38 (40) | 38 (48) | 600 | (155) |
| 1-ethyl-3-(2-fluorobenzyl)-urea | 43 | 63 | 700 | 89 |
| 1,1-dimethyl-3-(2-methylbenzyl)-urea | 44 (52) | 44 (69) | 500 | (149) |
| 1-(2,4-dichlorobenzyl)-3,3-dimethylurea | 57 (195) | 43 (150) | 250 | (270) |
| 1-(2-bromobenzyl)-3,3-dimethylurea | 61 (94) | 56 (106) | 300 | (295) |
| 1-(2,5-dimethylbenzyl)-3-methylurea | 66 | 66 | 700 | |
| 1-(4-chlorobenzyl)-3,3-dimethylurea | 85 | 85 | 300 | |

The $AED_{50}$ stands for the approximate dose and the $ED_{50}$ is the more accurate dose in mg./kg. which prevents convulsions in 50% of the mice tested. The $ALD_{50}$ is the approximate dose and the $LD_{50}$ is the more accurate dose which is lethal for 50% of the mice. The $ATD_{50}$ is the approximate dose and the $TD_{50}$ is the more accurate toxic dose for 50% of the mice by the rotorod test. The approximate dose was determined by testing less than the normal number of animals.

What we claim is:

1. A compound of the formula:

$$\underset{X}{\underset{|}{\bigcirc}}-CH_2-\underset{R_2}{\underset{|}{N}}-\underset{\underset{O}{\|}}{C}-\underset{R}{\overset{R_1}{N}}$$

in which X is a member of the group consisting of halogen and methyl, R is selected from the group consisting of hydrogen and methyl, $R_1$ is a methyl, and $R_2$ is selected from the group consisting of hydrogen and methyl.

2. 1-ethyl-3-(2-methylbenzyl) urea.
3. 1-(2-bromobenzyl)-3-methylurea.
4. 1-n-butyl-3-(2-fluorobenzyl) urea.
5. 1-(2-chlorobenzyl)-3, 3-dimethyl urea.
6. 1-(2-methylbenzyl)-3-methylurea.

References Cited in the file of this patent

Conant: Chem. of Organic Compounds, third edition (1947), page 332.
Boivin et al.: Can. J. Chem. vol. 29 (1951), pages 478–81.
Rowland et al.: J. Amer. Chem. Soc., vol. 73 (1951), pages 91–3.
Werner: J. Chem. Soc., London, vol. 117 (1920), pages 1046–53.
Trivedi et al.: J. Ind. Chem. Soc., vol. 35 (1958), pages 661–4.